Figure 1:
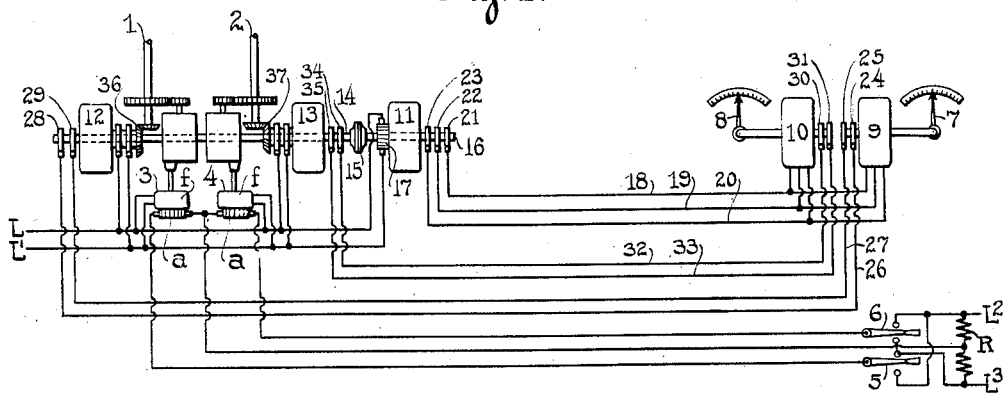

Nov. 20, 1923.　　　　　　　　　　　　　　1,474,944
F. L. RE QUA
DISTANT INDICATING MEANS
Filed June 30, 1919

INVENTOR.
Frederick L. Re Qua
BY
ATTORNEY

Patented Nov. 20, 1923.

1,474,944

UNITED STATES PATENT OFFICE.

FREDERICK L. RE QUA, OF MILWAUKEE, WISCONSIN, ASSIGNOR TO THE CUTLER-HAMMER MFG. CO., OF MILWAUKEE, WISCONSIN, A CORPORATION OF WISCONSIN.

DISTANT INDICATING MEANS.

Application filed June 30, 1919. Serial No. 307,747.

*To all whom it may concern:*

Be it known that I, FREDERICK L. RE QUA, a citizen of the United States, residing at Milwaukee, in the county of Milwaukee and State of Wisconsin, have invented new and useful Improvements in Distant Indicating Means, of which the following is a full, clear, concise, and exact description, reference being had to the accompanying drawing, forming a part of this specification.

This invention relates to means for use in conjunction with movable objects to indicate at a distant point the movements thereof.

While not limited thereto, the invention is particularly applicable to distant indicators for search lights and has among its objects to provide accurate and reliable indicating means which may be readily designed to meet any distance requirements within reasonable limits.

Another object is to provide means including a plurality of separately operable indicating devices and controlling media therefor which is in part common to said devices.

Other objects and advantages will hereinafter appear.

The accompanying drawing illustrates certain embodiments of the invention which will now be described, it being understood that the invention may be embodied in other forms falling within the scope of the appended claims.

Figure 2:
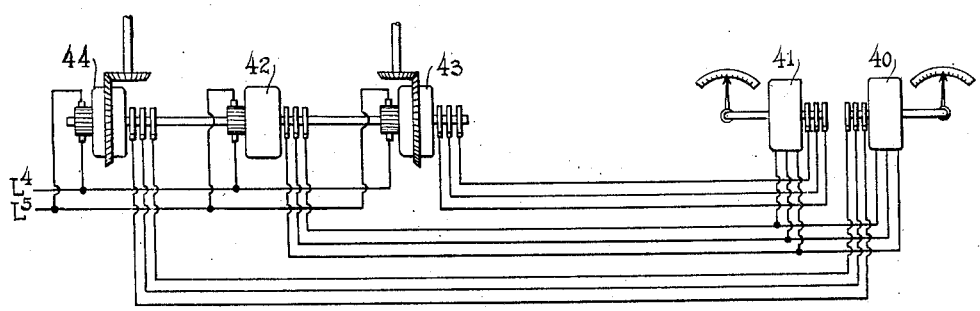

In the drawing,

Figure 1 diagrammatically illustrates an embodiment of the invention particularly adapted for search lights; and, Fig. 2 diagrammatically illustrates a modified form of indicating means for the same use.

Referring to Fig. 1, the indicating means is shown as applied to a conventional form of mechanism for effecting altitude and azimuth adjustments of a search light. This mechanism includes shafts 1 and 2 to be operatively connected to the search light and to be respectively operated to effect the aforesaid adjustments thereof, said shafts being operable by a Waterbury gear under the control of a pair of small motors 3 and 4. The motor 3 controls the operation of shaft 1, being reversible to effect reversals of said shaft while the motor 4 controls the operation of shaft 2, being reversible to effect reversals of said shaft. The motors are shown as provided with fields $f$ supplied from a direct current source L, L' and with armatures $a$ supplied from a direct current source $L^2$, $L^3$ through remote control switches 5 and 6 respectively. One armature terminal of each motor is connected to an intermediate point of a resistance R connected across line $L^2$, $L^3$ and the switches 5 and 6 are of the double throw type each being operable to complete the armature circuit of one motor and to reverse the flow of current therethrough.

The indicating means includes a device 7 for indicating the angular adjustments of shaft 1 and a device 8 for indicating the angular adjustments of shaft 2, said devices being respectively operable by motors 9 and 10. Both motors are shown as of the slip ring induction type each being provided with a three phase stator and a single phase rotor, although as will hereinafter appear, the rotors may also be polyphase. Further, the indicating means includes a rotary converter 11 for supplying a three phase current to the stators of the motors 9 and 10 and generators 12 and 13 for respectively supplying single phase currents to the rotors of motors 9 and 10, although rotary converters may be substituted for said generators. Generators 12 and 13 have their armatures mounted on a common shaft 14 connected through a coupling 15 to the shaft 16 of the rotary converter 11 to be driven thereby and both of said generators have slip rings connected to the d. c. supply circuit L, L'. The direct current source L, L' also supplies current to the commutator 17 of the rotary converter 11.

More specifically describing the connections between the motors 9 and 10 on the one hand and the rotary converter and generators on the other hand, the same are as follows: The stators of both motors are connected through conductors 18, 19 and 20 to slip rings 21, 22 and 23 provided on the rotary converter. Motor 9 has its slip rings 24 and 25 respectively connected by conductors 26 and 27 to slip rings 28 and 29 provided on generator 12 while motor 10 has its slip rings 30 and 31 respectively connected by conductors 32 and 33 to slip rings 34 and 35 on generator 13.

Thus assuming operation of the rotary converter and consequent operation of the generators, current is supplied to both motors 9 and 10, the stator current of each being three phase and the rotor current of each being single phase and further assuming a given phase relation of the currents supplied to each motor, no motion will be imparted to the rotor of said motor. On the other hand, assuming a change in phase relation of the current supplied to either motor, as by angular adjustments of the field member of its respective generator, the rotor of said motor is subjected to a torque causing said rotor to move through an angle equal to the angle of movement of the field of said generator and in a corresponding direction, it being assumed that each motor and its respective generator have an equal number of poles. Accordingly the indicating devices 7 and 8 funtion to respectively indicate the angular movements of the field members of generators 12 and 13 and said field members are rotarily adjustable and respectively connected through bevel gear sets 36 and 37 to shafts 1 and 2 whereby said devices 7 and 8 are controllable to likewise indicate the angular movements of said shafts and hence the adjustments of the search light.

As will be apparent, the above described method of supplying currents to the motors enables said motors to be placed at varying distances from the search light or other object without impairment of the accuracy and reliability of their operation by the resistance of the interconnections. Also, as will be apparent, the supply of polyphase current to the stator of each motor, thus producing a rotating magnetic field therefor, insures operation of its rotor in a definite direction upon a given change in the phase relation of the stator and rotor currents.

Referring to Fig. 2, the same shows an indicating mechanism including motors 40 and 41 similar to motors 9 and 10 but provided with three phase rotors, a rotary converter 42 similar to the rotary converter 11 and rotary converters 43 and 44 employed in lieu of the generators 12 and 13 for supplying three phase currents to the rotors of motors 40 and 41. The rotary converters 42, 43 and 44 are all supplied from a common direct current source $L^4$, $L^5$ and the interconnections of the five machines are the same as those above described except for the additional wires required for the rotor circuits. This mechanism functions in the same manner as that shown in Fig. 1.

It is of course to be understood that the terms "indicator" and "indicating means" as herein employed are not limited to means which function solely for indicating purposes but also comprehend means for performing additional functions such for example, as circuit control.

What I claim as new and desire to secure by Letters Patent is:

1. The combination with mechanically independent elements, of means for causing proportional movement of certain of said elements upon movement of other of said elements, said means including a double fed alternating current motor and means for supplying to the stator and rotor of said motor independent alternating currents of like frequency subject to relative phase displacement proportional to the degree of movement of said latter mentioned of said elements.

2. In means for causing like conditions and proportional degrees of movement of mechanically independent elements, in combination, a double fed alternating current motor to drive certain of said elements, individual dynamo electric machines to supply independent alternating currents of like frequency to the stator and rotor of said motor and means for subjecting said currents to relative phase displacement proportional to the degree of movement of another of said elements from a reference position thereof.

3. Means for causing like conditions and proportional degrees of movement of mechanically independent devices, comprising in combination, a double fed alternating current motor to drive one of said devices, individual dynamo electric machines having similar elements thereof constrained to move in unison for supplying to the stator and rotor of said motor independent alternating currents of like frequency, and means causing movement of another of said devices to effect corresponding and proportional relative movement of the static elements of said dynamo electric machines to thereby effect corresponding and proportional relative phase displacement of said currents.

4. Means for causing like conditions and proportional degrees of movement of mechanically independent devices, comprising in combination, a double fed alternating current motor to drive one of said devices individual dynamo electric machines having similar elements thereof constrained to move in unison for supplying to the stator and rotor of said motor independent alternating currents of like frequency and including at least one polyphase current, and means causing movement of another of said devices to effect corresponding and proportional relative movement of the static elements of said dynamo electric machines to thereby effect corresponding and proportional relative phase displacement of said currents.

5. Distant indicating means including a wound rotor induction motor, a rotary converter for supplying a polyphase current to one element of said motor and a dynamo electric machine operable in unison with said rotary converter for supplying alternating current to another element of said motor, said machine having a field member adjustable to effect like adjustments of the rotor of said motor.

In witness whereof, I have hereunto subscribed my name,

FREDERICK L. RE QUA.